UNITED STATES PATENT OFFICE.

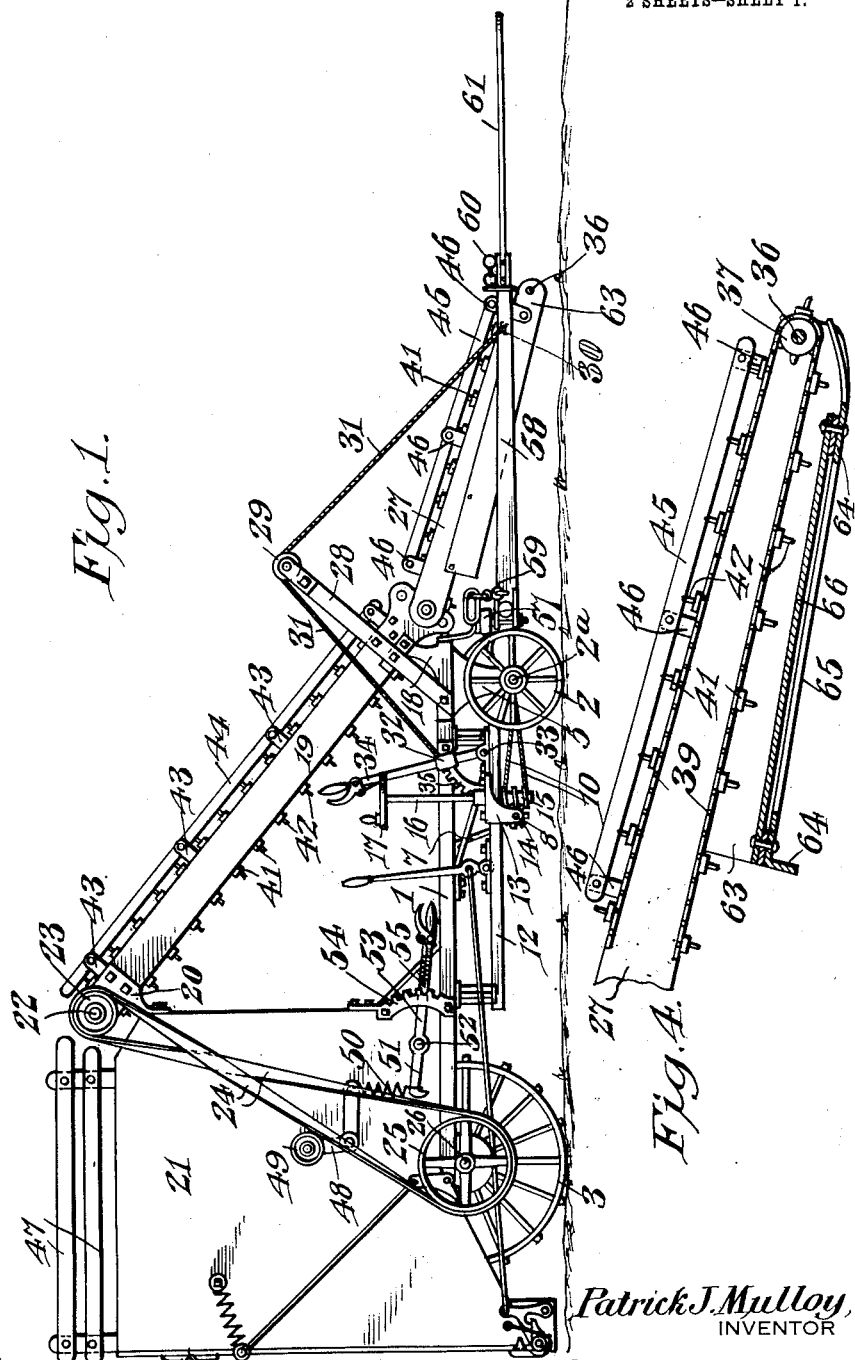

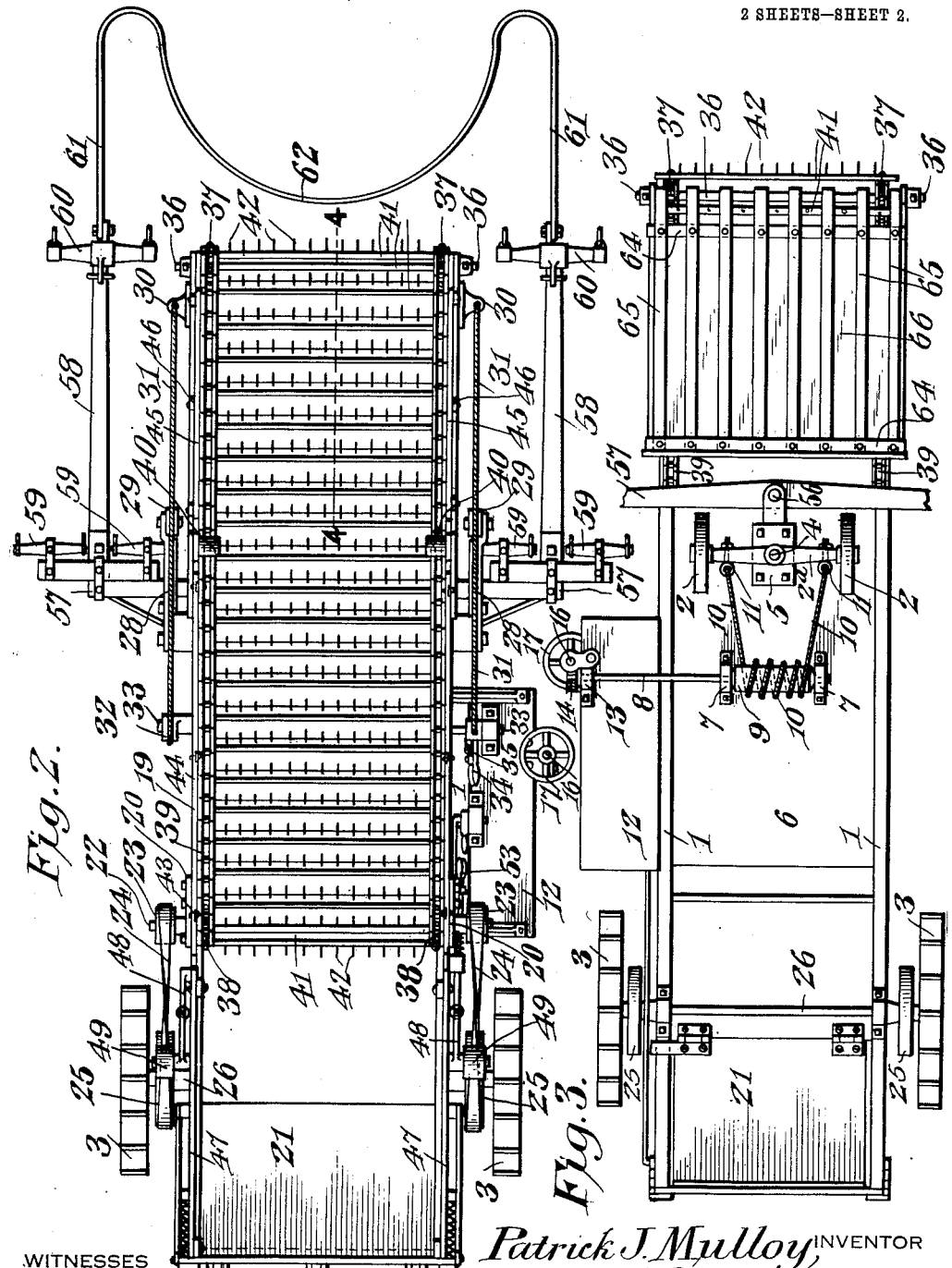

PATRICK J. MULLOY, OF GRAND FORKS, NORTH DAKOTA, ASSIGNOR OF ONE-HALF TO PHILIP S. HOUGHTON, OF GRAND FORKS, NORTH DAKOTA.

GRAIN-LOADER.

1,037,793.  Specification of Letters Patent.  Patented Sept. 3, 1912.

Original application filed September 4, 1906, Serial No. 333,108. Divided and this application filed August 18, 1910. Serial No. 577,797.

*To all whom it may concern:*

Be it known that I, PATRICK J. MULLOY, a citizen of the United States, residing at Grand Forks, in the county of Grand Forks and State of North Dakota, have invented a new and useful Grain-Loader, of which the following is a specification.

This invention has reference to improvements in means for loading grain in shocks in the field into a suitable receptacle, which latter, when loaded, may be moved to a point where the grain so gathered may be stored or utilized, and the object of the invention is to provide a means whereby the grain as it stands in shocks in the field may be gathered into a portable receptacle without the necessity of handling the bundles of grain, so that the grain may be readily carried to a threshing machine if this be the disposal contemplated.

While the machine of the present invention is designed primarily for the gathering of bundles of grain stored in shocks in the field and transporting the bundles so gathered to a place of deposit, the machine may be used for gathering other materials than grain and is therefore not limited in its application to grain alone, but for convenience of description the machine will be considered as used in connection with the gathering of grain stored in shocks, with the understanding that this limitation in the description and claims is not to be considered as a limitation of the use of the machine.

The machine of the present invention is particularly adapted for the gathering of the grain stored in shocks, this practice prevailing in the Northwest where the grain shocks are allowed to remain in the field and the grain is not stacked, but is carried from the field to the threshing machine.

The present invention relates more particularly to the means for gathering the bundles of grain and delivering them to the receptacle, the structure of the receptacle being described in detail and claimed in another application, Serial No. 333,108, filed by me September 4, 1906, for a grain and hay loading and transporting means, also showing the structures forming the subject matter of the present invention, and of which application the present application is a division.

The invention will be best understood from a consideration of the following detailed description taken in connection with the accompanying drawings forming a part of this specification, but the invention is by no means limited to the particular embodiment shown in the drawings and set forth in the following description, since the invention is susceptible of various modifications so long as the salient features of the invention are retained.

In the drawings:—Figure 1 is a side elevation of the machine with one of the rear wheels omitted. Fig. 2 is a top plan view thereof. Fig. 3 is a bottom plan view thereof with parts omitted. Fig. 4 is a section on the line 4—4 of Fig. 2.

Referring to the drawings, there is shown a frame 1 constituting the general support for the several structures, and, also, a part of the running gear. One end of this frame is supported on wheels 2, and the other end upon wheels 3, the latter being provided with peripheral ribs of the type usually employed on the drive wheels of traction engines, but these wheels are designed to be rotated by engagement with the ground as the structure is moved along over the ground, the wheels 3 thereby becoming power wheels for driving certain parts to be referred to. The wheels 2 are mounted on the opposite ends of an axle $2^a$ which is carried by a pin or bolt 4 projecting from a pivot casting 5 fast on the under side of a platform 6 joining the frame members 1.

Depending from the platform 6 are spaced journal bearings 7 for a shaft 8, and between these journal bearings the shaft 8 carries a drum 9 about which there is wound a cable 10 having its ends fast to the axle $2^a$ near the ends of the latter by eye-bolts 11, or otherwise, the arrangement being such that when the drum 9 is turned in one direction with the shaft 8, the axle $2^a$ will be swung one way, and when the drum 9 is turned in the other direction the axle $2^a$ will be swung the other way. By this means the machine may be steered by an operator. In order that this steering operation may be readily accomplished, there is provided a platform 12 at one side of the frame 1, and this platform carries a journal bearing 13 for the corresponding end of the shaft, and at this point the shaft is provided with a worm wheel 14 engaged by a worm 15 on the lower end of an upright shaft 16 provided at the other end with a manipulating wheel 17, whereby the shaft 16 may be readily turned by the operator to swing the axle 2ª in one direction or the other, as desired.

At the front end of the frame 1, there are provided bracket supports 18 for the lower end of an inclined conveyer frame 19, the upper end of which is secured by brackets 20 to a box 21, constituting a receptacle for material delivered thereto. Journaled in the upper end of the conveyer frame 19 is a shaft 22 having at each end a pulley 23 connected by a belt 24 to a corresponding pulley 25 on an axle 26 suitably journaled in the frame 1 and carrying the wheels 3. The wheels 3 and pulleys 25 are made fast on the axle 26, so that the axle and pulleys will participate in the rotative movement of the wheels 3 when the machine is drawn over the ground, the character of the wheels 3 preventing slipping of the latter over the ground because of the work imposed on them.

The conveyer frame 19 terminates a short distance in advance of the wheels 2 and to this end of the conveyer frame there is pivoted the rear end of another conveyer frame 27 extending for an appropriate distance beyond the front of the main frame 1. It is desirable that the conveyer frame 27 be adjustable about its rear support and for this purpose there are provided upwardly directed supporting members 28 on opposite sides of the conveyer frame 19, and also connected to the side members of the frame 1. These supporting members 28 carry at their upper ends sheaves 29. Made fast to an eye 30 near the front free end of the frame 27 on each side thereof is a rope or cable 31, extending over the corresponding sheave 29, and thence carried to a lever 32 in radial relation to a shaft 33 extending across the frame 1. The shaft 33 is provided with a lever 32 near each end, and one of the levers 32 carries a manipulating handle 34 provided with a latch in operative relation to a rack 35 of the usual construction, whereby a suitable manipulation of the handle 34 will result in the elevation or lowering of the outer free end of the frame 27, this frame being locked in adjusted positions by the latch of the handle 34.

Journaled in the front end of the frame 27 is a shaft 36 carrying sprocket wheels 37 and other sprocket wheels 38 are mounted on the shaft 22. These sprocket wheels carry sprocket chains 39 on opposite sides of the frames 19 and 27, which latter together constitute in effect one conveyer frame with an intermediate joint at which the direction of the sprocket chains may be diverted to permit the changeable relation of the frame 27 to the frame 19. To hold the sprocket chains 39 into proper relation with the frames 19 and 27, idler rollers 40 are provided at the joint between the two frames 19 and 27. The conveyer belt comprises an endless series of slats 41 carried by the chains 39, and each slat is provided with a series of outstanding pins 42 disposed longitudinally of the slat.

On opposite sides of the frame 19 are brackets 43 carrying longitudinal guide bars 44, one on one side of the frame 19 and the other on the other side, while like bars 45 carried by like brackets 46 are disposed along opposite sides of the frame 27, these bars 44 and 45 serving to maintain material on the conveyer belt from accidentally escaping therefrom at the sides. Like bars 47 are carried by the upper end of the box or receptacle 21, so that material passing from the upper end of the conveyer will be directed into the interior of the box.

When the vehicle moves over the ground in a forward direction, this being toward the right as viewed in Fig. 1, motion is transmitted from the wheels 3 through the axle 21 to the pulleys 25, thence by the belts 24 to the pulleys 23, and from the latter to the shaft 22 and through the sprocket wheels 38 and chains 39 movement is imparted to the conveyer belt in a direction to elevate any material disposed thereon, such material finally escaping from the upper end of the belt and dropping into the receptacle 21.

It is desirable that the conveyer belt should not be actuated when the vehicle is being transported to or from the field, and material is not being conveyed to the receptacle 21. For this reason the belts 24 are made to run slack so as to slip on the pulleys 23 or 25, and when it is desirable to put the conveyer into service, the belts are tightened so that motion is then imparted to the conveyer from the pulleys 25. For this purpose there is mounted on each side of the receptacle 21 a bell crank lever 48 carrying at one end a roller 49, and at the other end connected by a spring 50 to an arm 51 fast on a shaft 52 extending from one side to the other of the receptacle 21. One of the arms 51 is continued as a manipulating member 53 in operative relation to a rack 54, and a latch 55 carried by the member 53 serves to hold the member 53 in adjusted positions. By a suitable manipulation of the member 53, which is carried into operative relation to the platform 12 where the operator is located, the shaft 52 is rocked in one direction or the other, and motion is transmitted through the elastic connections 50 to the bell crank levers 48 and the rollers 49 are moved into or out of engagement with the belts 24 in accordance with the direction of movement of the member 53. By this means both belts may be tightened or loosened at will, and the conveyer put into or out of service as may be desired.

Connected to the casting 5 by a pivot connection 56 is a draft beam 57 extending to opposite sides of the frame 1, and at each side thereof carrying a pole 58 provided with whiffle trees 59 and a neck-yoke 60 for a team of horses, the particular arrangement of the vehicle being designed for four draft animals, horses being the usual draft animals employed. Extending from the front end of each pole 58 is the corresponding end of a rod or bar 61, the ends of this rod or bar being in parallel relation one to the other and spaced apart a distance equal to the distance between the front ends of the poles 58. The ends of the rod or bar are connected by an intermediate rearwardly curved yoke 62 in front of the conveyer, but spaced therefrom a short distance. The curved portion 62 of the rod or bar, which because of its function may be termed a shock overturning member, may be wider at the widest point than the width of the conveyer, while the curvature of the rod or bar is such as to always direct the shock toward the center line of travel of the machine, so as to be in the path of the front end of the conveyer when the latter reaches the overturned shock.

It will be observed that the rod or bar 61 is supported wholly by the front ends of the poles 58 and consequently the height of this rod or bar above the ground is determined entirely by the height of the free ends of the poles 58 from the ground, which ends are upheld by the draft animals.

The front end of the conveyer frame 27 is located, in operation, close to the ground, and in order to prevent the frame 27 or the pins 42 of the slats 41 from coming in engagement with the ground or with obstructions thereon, the frame 27 is provided on each side with a runner 63 which will engage the surface of the ground and uphold the front end of the frame 27 should the latter be lowered sufficiently, or will engage obstacles in the path of the conveyer and lift the front end of the frame over the same.

To protect the under-running portion of the conveyer belt, cross bars 64 are provided and these carry spaced runner strips 65, the front ends of which are upturned. There is also provided a plate 66 overlying the strips 65 and serving to still further guard the under-running portion of the conveyer belt.

If it be assumed that a field of grain has been cut and the bundles discharged from the harvesting machine have been gathered into shocks, and that it is desirable to convey the grain from the field to the threshing machine or other point of deposit, then the machine of the present invention is directed over the field, being drawn by draft animals, in the particular showing of the drawings the arrangement being for four horses, but it will be understood that a greater or a less number of horses may be used, or other means for actuating the machine may be employed. The overturning rod or bar 61 is directed toward a shock of grain and the curved portion 62 engages the same at an appropriate height to upset the shock so that the bundles will lie prone on the ground in the path of the on-coming lower end of the conveyer. In the meantime the member 53 has been manipulated to bring the rollers 49 into engagement with the belts 24 to tighten the latter, and the conveyer belt is moving in such direction that the upper run will travel from the lower or receiving end of the conveyer toward the upper or discharge end adjacent to the receptacle 21. As soon as the lower end of the conveyer reaches the bundles of grain lying upon the ground, they are picked up by the conveyer and carried by the belt toward the receptacle 21 to be ultimately deposited therein. It will be observed that the curved portion of the rod or bar 61 may engage a shock out of the center line of travel of the machine, but if so engaging a shock, the latter will be directed by the curved member 62 toward the center line of the machine, so that when the shock is overturned it will lie in operative relation to the conveyer in position to be picked up by the latter. Furthermore, the overturning frame is sufficiently in advance of the machine to insure the knocking down of the shock before the conveyer reaches it. It is to be observed, however, that the overturning of the shock is due solely to the advancing movement of the machine, the rod or bar 61 participating in this advancing movement at the same rate of travel as the machine, while the shocks are thrown down in a direction coinciding with the direction of travel of the machine. The machine is directed by the operator over the field until a sufficient amount of grain has been gathered to fill the receptacle 21, and then the front section of the conveyer may be elevated and the belts 24 may be loosened so that the conveyer becomes quiescent, and then the machine may be directed to the point of deposit, which may be assumed to be adjacent to a threshing machine, when the contents of the receptacle 21 may be allowed to escape therefrom in any suitable manner, the structure of this receptacle forming no part of the present invention, and description thereof having, therefore, been omitted, being fully described in the aforesaid application.

The bar 61 serves as a spacing means for the front ends of the poles 58 whether or not the bar be also utilized as a shock overturning means.

What is claimed is:—

1. In a loader for grain, a receptacle for the grain, a conveyer leading to said receptacle, and a shock overturning means extending forwardly beyond the front of the conveyer, said overturning means being non-rotatably mounted on the loader for participation in the forward movement of the loader so as to overturn the shocks by contacting therewith.

2. In a grain loader, a conveyer for the grain, and an overturning means for the shocks mounted on the loader and extended forwardly beyond the front of the loader for engaging and acting on the shocks to overturn them in a direction away from and in line with the receiving end of the conveyer.

3. In a grain loader, an overturning means for the shocks mounted on the loader and extended beyond the front thereof in the line of travel and in operation approximately horizontal, said overturning means engaging the shocks to overturn them in a direction away from and in the line of travel of the front end of the loader.

4. In a grain loader, a conveyer, and an overturning means for the shocks mounted on the loader in substantially fixed relation thereto in front of the conveyer and having the shock contacting portions of greater lateral extent than the conveyer and shaped to direct the shocks on being overturned into the path of the receiving end of said conveyer.

5. In a grain loader, a shock overturning means provided with sustaining means therefor mounted on the loader and provided with means whereby the sustaining means are adapted to be supported by the draft animals used to propel the machine.

6. In a grain loader, a conveyer, draft appliances on each side thereof, and a shock overturning means in advance of the receiving end of the conveyer and mounted on the draft appliances.

7. In a grain loader, a conveyer, draft appliances on each side thereof, and a shock overturning means mounted on the forward ends of and controlled by the draft appliances.

8. In a grain loader, a conveyer, draft appliances on each side thereof, and a shock overturning means mounted on the forward ends of and controlled by the draft appliances, the shock overturning means extending in front of the receiving end of the conveyer in spaced relation thereto.

9. In a grain loader, a conveyer, draft appliances on each side thereof, and a shock overturning means mounted on the forward ends of and controlled by the draft appliances, the shock overturning means extending in front of the receiving end of the conveyer in spaced relation thereto, and movable actively in the same direction and at the same speed as the forward movement of the machine.

10. In a machine of the character described, the combination with a supporting frame, of conveying mechanism mounted thereon, said mechanism including a hinged frame projecting in advance of the supporting frame, and having a belt operating thereupon, depending runner blades secured to the opposite sides of the hinged frame, cross bars secured to the underside of the hinged frame, and runner strips fastened to said cross bars between the runner blades, said strips extending longitudinally of the hinged frame and being upturned at the front ends.

11. In a machine of the character described, the combination with a movable support, of a conveyer mounted thereon, and a rearwardly bowed shock overturning device mounted on and movable with the support and disposed in advance of the receiving end of the conveyer.

12. In a machine of the character described, the combination with a movable supporting frame, of a conveyer mounted thereon and movable therewith, and a rod or bar having a central rearwardly bowed portion arranged in advance of the conveyer and connected at the ends to the supporting frame.

13. In a grain loader, a conveyer, independent draft means on opposite sides of said conveyer, and connecting means extending transversely of the conveyer from one draft means to the other at points in front of draft animals when attached to the draft means, said connecting means serving to maintain a substantially constant distance between the draft means on the opposite sides of the conveyer.

14. In a grain loader, a conveyer, independent draft means on opposite sides thereof and including tongues or poles, and connecting means extending from the free end of one of the tongues to the free end of the other tongue transversely of the conveyer for maintaining the distance between the forward ends of said draft means substantially constant.

15. In a grain loader, a conveyer, draft means on opposite sides thereof and including tongues or poles, and a shock overturning device connected at the ends to the forward ends of the tongues, said shock overturning device extending across the front of the conveyer in advance thereof and there rearwardly bowed.

In testimony, that I claim the foregoing as my own, I have hereto affixed my signature in the presence of two witnesses.

PATRICK J. MULLOY.

Witnesses:
R. G. BATES,
ERNEST KORKE.